US012583015B2

(12) United States Patent
Khan et al.

(10) Patent No.: US 12,583,015 B2
(45) Date of Patent: Mar. 24, 2026

(54) METHODS FOR SELF-ASSEMBLING MONOLAYERS TO MITIGATE HYDROGEN PERMEATION

(71) Applicants: SIMON FRASER UNIVERSITY, Burnaby (CA); NATIONAL RESEARCH COUNCIL OF CANADA, Ottawa (CA)

(72) Inventors: Sami Khan, New Westminster (CA); Md. Aminul Islam, Surrey (CA); Ishaan Aggarwal, Surrey (CA)

(73) Assignees: Simon Fraser University, Burnaby (CA); National Research Council of Canada, Ottawa (CA)

( * ) Notice: Subject to any disclaimer, the term of this patent is extended or adjusted under 35 U.S.C. 154(b) by 183 days.

(21) Appl. No.: 18/133,988

(22) Filed: Apr. 12, 2023

(65) Prior Publication Data

US 2024/0342753 A1 Oct. 17, 2024

(51) Int. Cl.

| | |
|---|---|
| ***B05D 7/14*** | (2006.01) |
| ***B05D 3/00*** | (2006.01) |
| ***C21D 1/34*** | (2006.01) |

(52) U.S. Cl.

CPC ............. *B05D 7/146* (2013.01); *B05D 3/002* (2013.01); *C21D 1/34* (2013.01)

(58) Field of Classification Search

None

See application file for complete search history.

(56) References Cited

U.S. PATENT DOCUMENTS

| | | | | |
|---|---|---|---|---|
| 9,957,553 | B2 * | 5/2018 | Kayyem | B01L 3/502715 |
| 2010/0098876 | A1 * | 4/2010 | Hanson | B82Y 30/00<br>427/535 |

(Continued)

FOREIGN PATENT DOCUMENTS

| | | | |
|---|---|---|---|
| CA | 1187038 | A | 5/1985 |
| CA | 1228328 | A | 10/1987 |

(Continued)

OTHER PUBLICATIONS

CER—Canada's Pipeline System 2021—Crude Oil Pipeline Transportation System. https://www.cer-rec.gc.ca/en/data-analysis/facilities-we-regulate/canadas-pipeline-system/2021/crude-oil-pipeline-transportation-system.html.

(Continued)

*Primary Examiner* — Joshua L Allen
*Assistant Examiner* — Bradford M Gates
(74) *Attorney, Agent, or Firm* — Borden Ladner Gervais LLP; Geoffrey deKleine

(57) ABSTRACT

The presently disclosed methods provide for preparing a stable hydrophobic self-assembled monolayer (SAM) coating, that includes preparing a SAM solution by combining a SAM compound with an initial solvent and an additional solvent and mixing, in a sealed container, the SAM solution at a first fixed temperature at a constant rotational speed for a first fixed time interval. The SAM coating is then prepared by treating a substrate to achieve pristine state, and heating the substrate at a second fixed temperature for a second fixed time interval. Then within a sealed container, immersing the substrate in the SAM solution for a third fixed time interval. Following the completion of the third fixed time interval, the substrate is removed from the sealed container and treated with the initial solvent and the additional solvent to remove (Continued)

100

104

102 excess SAM material, and heated at a third fixed temperature.

15 Claims, 11 Drawing Sheets

(56) References Cited

U.S. PATENT DOCUMENTS

| | | | | |
|---|---|---|---|---|
| 2019/0169132 | A1* | 6/2019 | Crudden | G01N 21/554 |
| 2019/0322812 | A1* | 10/2019 | Wojtecki | G03F 7/20 |
| 2019/0386237 | A1* | 12/2019 | Benwadih | H10F 77/244 |
| 2022/0109073 | A1* | 4/2022 | Chen | H10D 86/423 |
| 2022/0267571 | A1* | 8/2022 | Fihri | C08K 7/10 |

FOREIGN PATENT DOCUMENTS

| | | | |
|---|---|---|---|
| CA | 2453573 | A1 | 1/2003 |
| CA | 2899513 | A1 | 10/2014 |
| CA | 3065183 | A1 | 12/2018 |

OTHER PUBLICATIONS

Crank., "The Mathematics of Diffusion," Clarendon Press, 1975.

Devanathan et al., "The Adsorption and Diffusion of Electrolytic Hydrogen in Palladium," Proceedings of The Royal Society A: Mathematical, Physical and Engineering Sciences, 1962, vol. 270, pp. 90-102.

Gharbi et al., "Alkyl Phosphonic Acid-based Ligands as Tools for Converting Hydrophobic Iron Nanoparticles Into Water Soluble Ironiron Oxide Coreshell Nanoparticles," New Journal of Chemistry, 2017, vol. 41, pp. 11898-11905.

Mohammadijoo et al., "Canadian Hsla Steel Pipelines: History and Technology Developments," ERA, 2018, pp. 01-08.

Nagumo et al., "Fundamentals of Hydrogen Embrittlement," Springer, 2016, pp. 1-241.

Nam et al., "Graphene Coating as a Protective Barrier Against Hydrogen Embrittlement," International Journal of Hydrogen Energy, 2014, pp. 01-08.

Nemanic et al., "Hydrogen Permeation Barriers: Basic Requirements, Materials Selection, Deposition Methods, and Quality Evaluation," Nuclear Materials and Energy, 2019, vol. 19, pp. 451-457.

The Hydrogen Strategy for Canada. Clean50 https://clean50.com/projects/lofty-ambitions-for-hydrogen-development- and-implementation-of-the-hydrogen-strategy-for-canada%e2%80%af/ (2021).

Voloshchuk et al., "Hydrogen Entry and Absorption in Zro2 Coated Iron Studied By Electrochemical Permeation and Desorption Techniques," International Journal of Hydrogen Energy, 2012, vol. 37, pp. 1826-1835.

Yue et al., "Hydrogen Energy Systems: a Critical Review of Technologies, Applications, Trends and Challenges," Renewable and Sustainable Energy Reviews, 2021, vol. 146, pp. 1-21.

Zajec et al., "Hydrogen Permeation Barrier E Recognition of Defective Barrier Film From Transient Permeation Rate," International Journal of Hydrogen Energy, 2011, vol. 36, pp. 7353-7361.

* cited by examiner

200

202 204

300

302

304

400

500

600

700

800

METHODS FOR SELF-ASSEMBLING MONOLAYERS TO MITIGATE HYDROGEN PERMEATION

BACKGROUND

The present disclosure is directed to systems and methods for providing a monolayer coating to metals which may be used to mitigate hydrogen embrittlement.

SUMMARY

In the effort against climate change, alternatives to fossil fuels are urgently needed for electricity and transportation needs. Hydrogen is a viable clean replacement given that burning hydrogen only releases water. This makes it an attractive fuel in comparison to natural gas. Recognizing this, many countries have instated a national hydrogen strategy with plans to supply hydrogen through the pipeline network built historically for natural gas transportation. Hydrogen, being the element with the smallest atom, is able to diffuse through pipeline steel and cause embrittlement. This is an undesirable process by which hydrogen gas can dissociate and diffuse through container walls, causing weakness in the steel and compromising the safety of the pipelines. In this research, we developed self-assembled monolayer coatings such as fluoroalkyl (C10) phosphonic acid that fundamentally disrupted hydrogen permeation and consequently reduced hydrogen embrittlement.

Hydrogen has long been touted as a clean fuel given that the only by-product of combusting hydrogen is water[1]. An important factor in the realization of the hydrogen economy is the safe and reliable transportation of hydrogen by using existing infrastructure. In accordance with the goals set in the Hydrogen Strategy for the nation of Canada, there is a pressing need for high-volume transportation of hydrogen gas.[2] This is best accomplished by utilizing Canada's existing natural gas pipeline network which spans a distance of 840,000 km.[3] Blending hydrogen with natural gas is a key first step towards widescale hydrogen transportation.

In particular, hydrogen embrittlement, which occurs when the strength of metals drastically reduces as a result of the introduction of hydrogen atoms into the metal[4]. In pipeline steels, there are numerous "stress sites", which can be fractures, cracks, wears, tears, pits and other similar defects which are highly susceptible to hydrogen diffusion and thus embrittlement[4]. Previous research has developed stronger steels that withstand hydrogen embrittlement[4] but it is not feasible to replace such a large existing pipeline network with new alloys altogether given the costs involved and detrimental environmental impact. Barrier coatings have been studied in the past to reduce hydrogen entry[5], but hydrogen can diffuse through defects in coatings like cracks and holes. Furthermore, coatings may not always stick to the metal surface and can spall over time. Previous research conducted on thicker coatings[5-7], ultimately showed unexpectedly increased the risk of hydrogen embrittlement. This increased risk was attributed to hydrogen diffusion and accumulation of hydrogen within defects present in the coating, thereby increasing the sub-surface concentration of hydrogen and consequently increasing hydrogen diffusion flux.[7,8] Hence, there is a need for a solution which overcomes these known drawbacks.

Accordingly, the disclosed methods herein provide for self-assembled monolayer coatings (e.g., fluoroalkyl (C10) phosphonic acid) that disrupted hydrogen permeation and consequently reduced hydrogen embrittlement. The presently disclosed methods provide for preparing a stable self-assembled monolayer (SAM) coating, that includes preparing a SAM solution by combining a first quantity of a SAM compound to a second quantity of an initial solvent and a third quantity of an additional solvent to form the SAM solution. In a sealed container, the SAM solution is then mixed at a first fixed temperature at a constant rotational speed for a first fixed time interval. The SAM coating is then prepared by treating a substrate to achieve pristine state, and heating the substrate at a second fixed temperature for a second fixed time interval. Then within a sealed container, immersing the substrate in the SAM solution for a third fixed time interval. Following the completion of the third fixed time interval, the substrate is removed from the sealed container and treated with the initial solvent and the additional solvent to remove excess SAM material, and finally heated at a third fixed temperature for a fourth fixed time interval.

Lab results indicate, when coated on Stainless Steel 430 and X70 pipeline steel, there is magnitudes of reduction in the hydrogen diffusion coefficient and hydrogen flux with the Devanathan-Stachurski cell method. This novel methodology has large-scale implications to using hydrogen as a fuel safely and widely. Furthermore, the self-assembled coating can be developed as protection for corrosion in many industrial systems beyond hydrogen.

BRIEF DESCRIPTION OF THE DRAWINGS

The below and other objects and advantages of the disclosure will be apparent upon consideration of the following detailed description, taken in conjunction with the accompanying drawings, in which the reference characters refer to like parts throughout, and in which.

DETAILED DESCRIPTION

Figure 1:
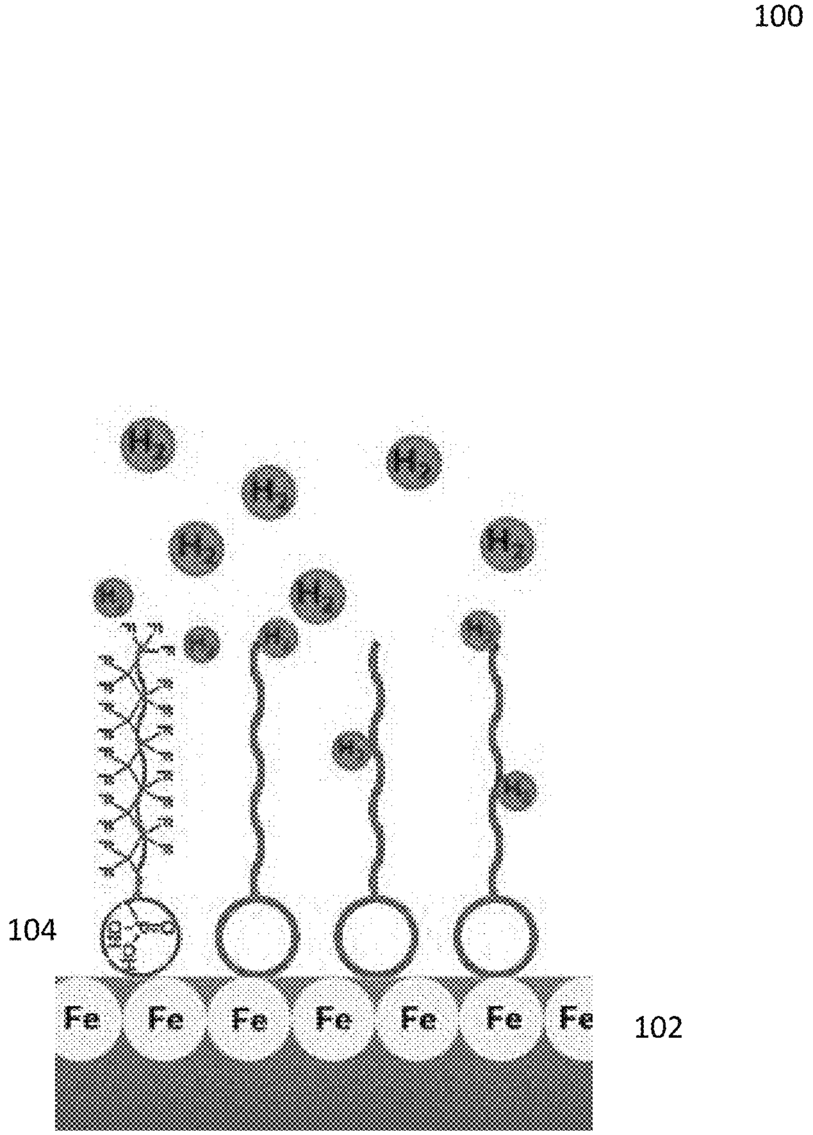
FIG. 1 illustrates a molecular diagram of a Fluoroalkyl (C10) phosphonic acid (FAPA) monolayer coating, in accordance with some embodiments of the disclosure.

The disclosed methods herein provide for self-assembled monolayer coatings that disrupted hydrogen permeation and consequently reduced hydrogen embrittlement. In some embodiments, the coating may be fluoroalkyl (C10) phosphonic acid ("FAPA"). FIG. 1 illustrates a molecular diagram 100 of a Fluoroalkyl (C10) phosphonic acid (FAPA) monolayer coating, in accordance with some embodiments of the disclosure. The phosphate-oxide group bonds, denoted 104, to the iron molecules within the pipe, denoted 102. FAPA has been previously researched as a hydrophobic coating on iron.[9]

Figure 2:
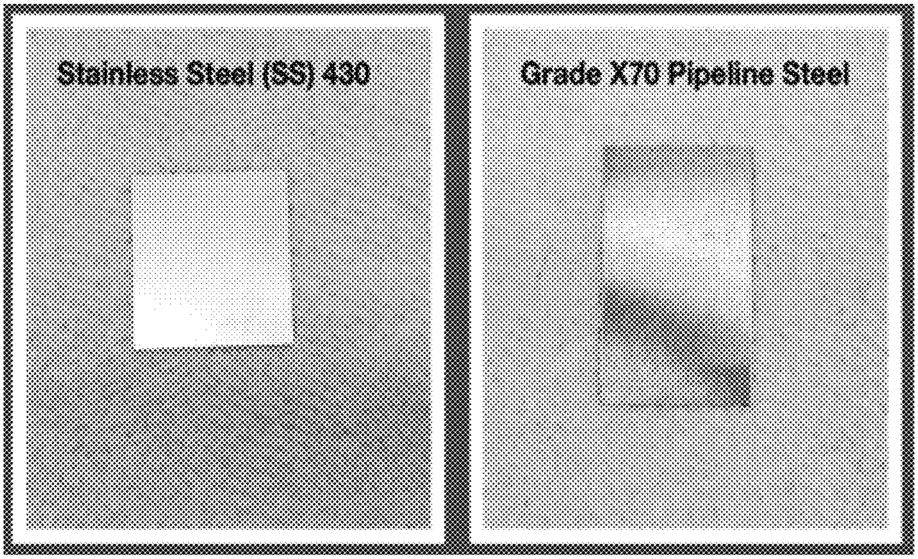
FIG. 2 illustrates exemplary substrates that were used for testing, in accordance with some embodiments of the disclosure.

For lab testing, the FAPA used in this research was procured from Specific Polymers in France. Two types of steel were tested in this research under identical controlled environments—stainless steel 430 (430SS) and API 5L X70 steel (X70). In lab testing, both samples of steel were cut into squares and rectangles with a thickness of 300 micrometers. FIG. 2 illustrates these exemplary substrates 200 that were used for testing, in accordance with some embodiments of the disclosure. In yet other embodiments, the coating may be other types of chemical compounds which have long-chain alkyl groups with a acidic branch (e.g., C16 alkyl phosphonic acid, or Poly(propylene glycol), a,w-bis (triethoxysilane).

Figure 9:
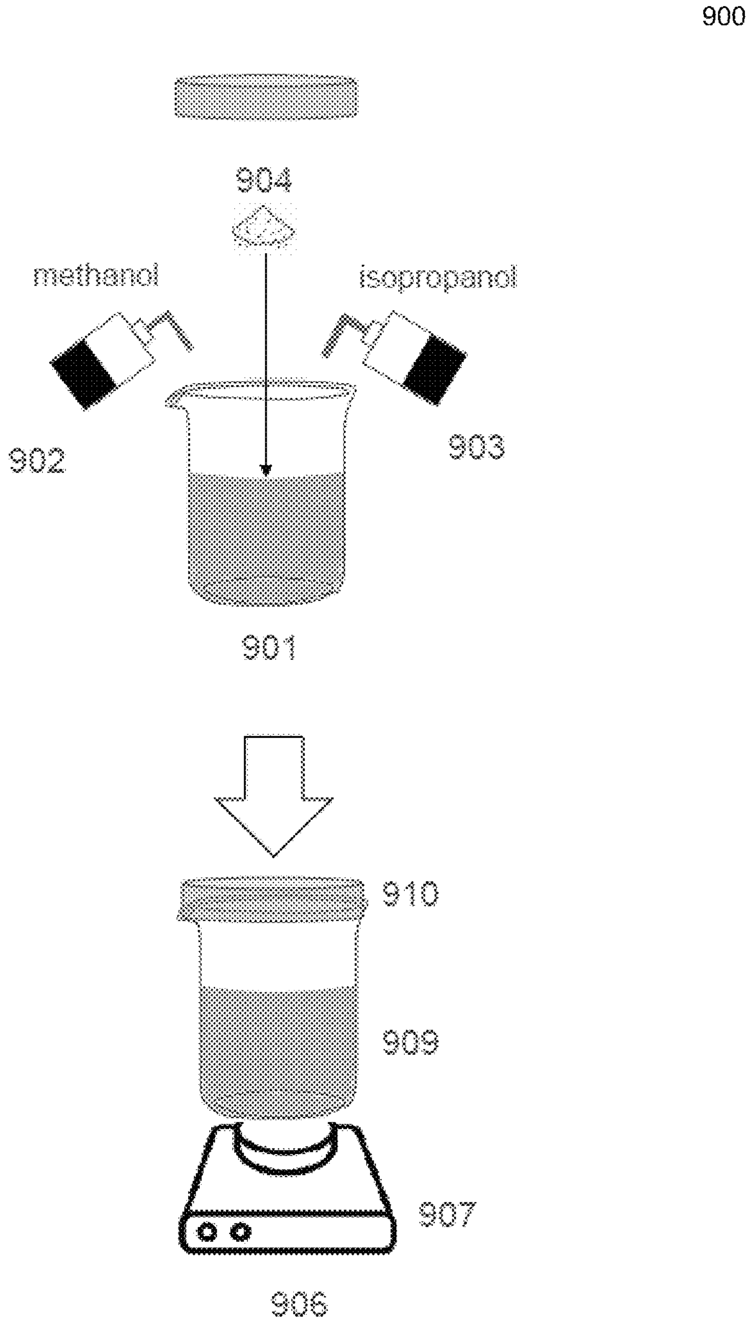
FIG. 9 shows an exemplary preparation process for a SAM solution, in accordance with some embodiments of the disclosure.

The disclosed methods provide for preparing a SAM solution by combining a first quantity of a SAM compound to a second quantity of an initial solvent and a third quantity of an additional solvent to form the SAM solution. FIG. 9 shows an exemplary preparation process 900 for a SAM solution, in accordance with some embodiments of the disclosure. At step 901, a SAM solution is being combined by adding methanol 902 and isopropanol 903, both solvents, to the FAPA 904. In one exemplary embodiment, a SAM solution is created by adding 0.4 g of C10 fluoroalkylphosphonic acid to 49.8 g of methanol and 49.8 g of isopropanol. It was found through testing that optimal distribution of solvent(s) to SAM is: 0.4% SAM, 49.8% solvent 1, and 49.8% solvent 2. In some embodiments, the SAM may be altered to +/−1% depending on chain length and the acid subgroup of the molecule. In some embodiments, the solvents implemented may be any aliphatic or aromatic alcohol (e.g., benzyl alcohol, or ethanol). Combination of the elements, namely SAM, and solvents, may be accomplished by conventional dissolution techniques.

The disclosed methods provide that the SAM solution is mixed, in a sealed container, at a first fixed temperature at a constant rotational speed for a first fixed time interval. In some embodiments, the temperature is set to 30° C. to enhance the dissolution of the SAM in the solvents. In some embodiments, the temperature may be adjusted to a set temperature that is lower than the boiling point of the solvent. As an example, methanol has a boiling point of 64° C. Thus, the temperature may be adjusted to any temperature less than 64° C. In some embodiments, to increase the temperature, a hot plate may be implemented, and/or the solution may be inserted into an oven. The mixing is performed within a sealed container. As shown in FIG. 9, step 906, a SAM solution is being heated on a hotplate 907 and has a seal 910 on the container of SAM solution 909. In some embodiments, the sealed container is a bottle, a sealed glassware, and/or any container which prevents evaporation loss of solvent. The rotational speed that was found to be optimal was 100-200RPM. The rotational speed cannot be increased to a rate where the solvent mixing is overly turbulent. Turbulence may result in ineffective mixing of the SAM to the solvents. In some embodiments, mixing the SAM solution may implement a magnetic stir bar, and/or sonication via tip sonicator.

Figure 10:
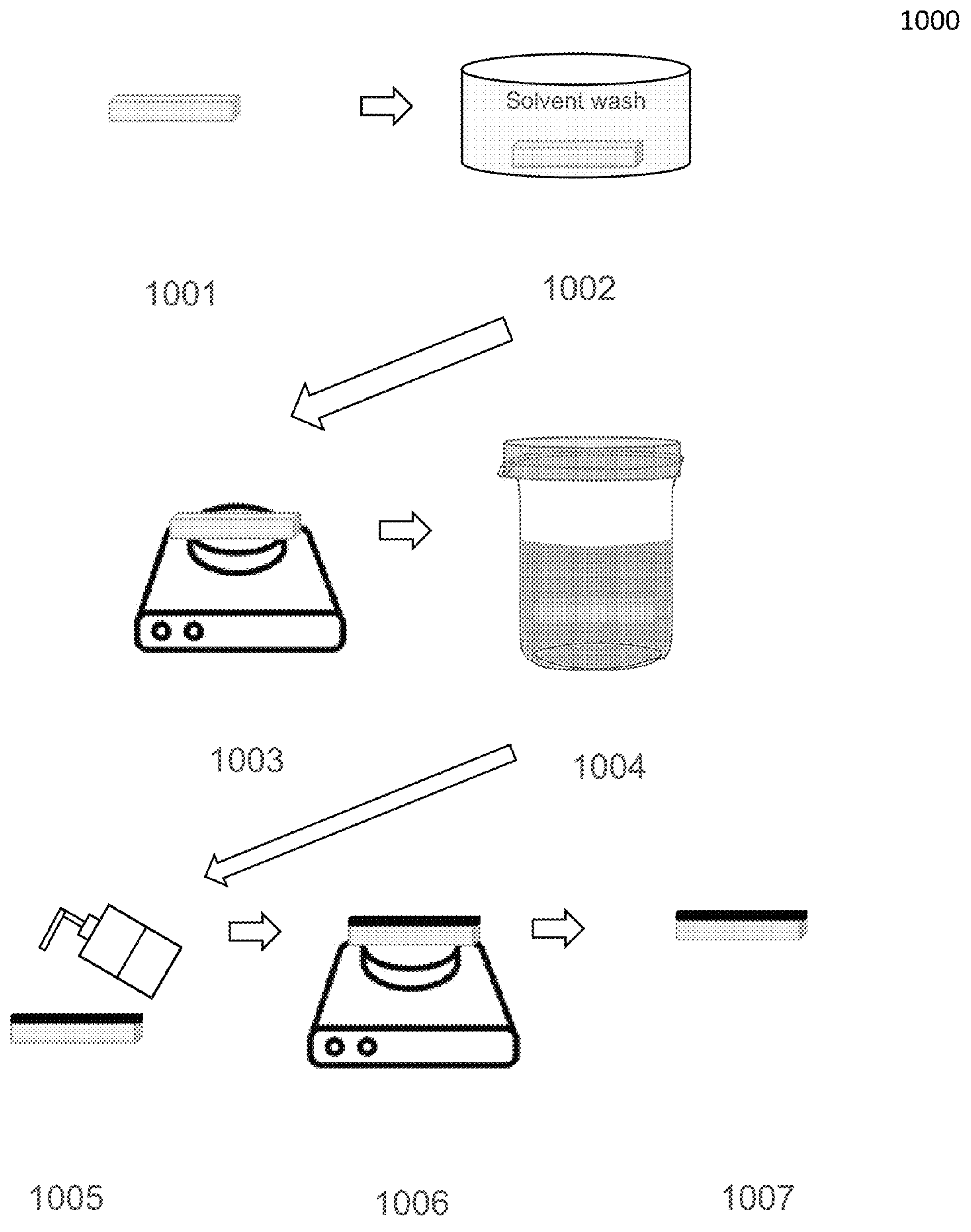
FIG. 10 shows an exemplary preparation process for a SAM coating, in accordance with some embodiments of the disclosure.

The disclosed methods include preparing the SAM coating. To prepare the coating, the substrate may be treated to achieve pristine state. A pristine state may be defined as the surface organic contamination is below a threshold of 15% by atomic percentage. In some embodiments, the treatment process may implement a solvent bath utilizing solvents, heating the substrate to 500° C. for a specific time interval, and/or implementation of plasma cleaning to the substrate. FIG. 10 shows an exemplary preparation process 100 for the SAM coating, in accordance with some embodiments of the disclosure. The substrate 1001 is treated in a solvent bath 1002. In lab experiments, as an example, the substrate was sonicated in acetone, methanol and deionized water respectively for 5 minutes each.

The disclosed methods provide for heating the substrate at a second fixed temperature for a second fixed time interval. As mentioned previously, this is done to ensure there is minimal surface contamination of the substrate. In some embodiments, the second fixed temperature is configured at 100° C. for 30 minutes. FIG. 10 illustrates the substrate being heated on a hot-plate in 1003.

The disclosed methods provide, within a sealed container, immersing the substrate in the SAM solution for a third fixed time interval. This step allows the SAM solution to self assemble on the substrate. From lab results, optimal configuration suggests 48 hours time interval to allow for self-assembly. In some embodiments, a 24 hours interval may be sufficient for self-assembly depending on the SAM variant used. FIG. 10 illustrates the substrate being immersed in the SAM solution 1004.

The disclosed methods provide, following the completion of the third fixed time interval, the substrate is removed from the sealed container and treated with the initial solvent and the additional solvent to remove excess SAM material. Occasionally, excess SAM material may be deposited on the substrate and requires removal. Removal is achieved by treating the coated substrate with the initial solvent and the additional solvent (e.g., methanol and isopropanol). FIG. 10 illustrates this process where the substrate is being treated using the solvents 1005.

The disclosed methods provide that the final step of preparing the SAM coating involves heating the substrate at a third fixed temperature for a fourth fixed time interval to strengthen the adhesion to the substrate. In some embodiments, the substrate (e.g. API 5L X70 steel) may be heated at 100° C. for 30 minutes. FIG. 10 illustrates this process where the substrate is being heated at 1006 and eventually removed with the adhesion of the SAM on the substrate 1007. As an example, lab experiments showed that the phosphonic acid group ionically bonded with the first layer of iron atoms on steel creating a strong adhesion.

Figure 3:
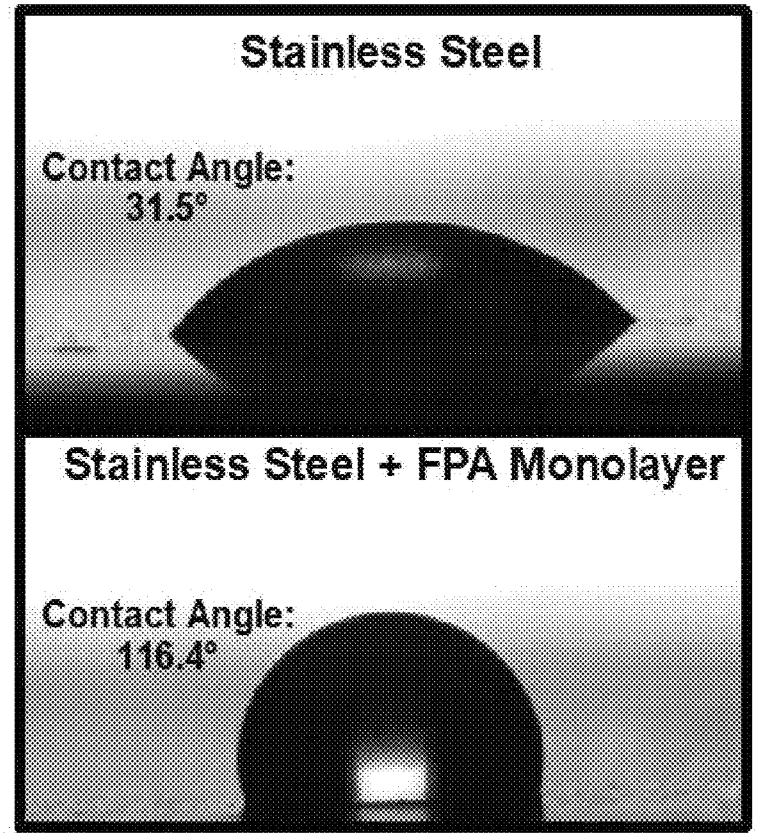
FIG. 3 illustrates measurements of contact angles on SAM coated and uncoated substrates, in accordance with some embodiments of the disclosure.

After performing the above technique, laboratory results provided empirical proof of the efficacy of the coating. FIG. 3 illustrates measurements of contact angles on SAM coated and uncoated substrates 300, in accordance with some embodiments of the disclosure. Contact angles were measured using water droplets to confirm the presence of the monolayer as well as the hydrophobicity of the coating. We found a static contact angle of 116° on the FAPA-coated steel 304, compared to 31.5° on as-received steel 302, proving that the monolayer is indeed deposited and hydrophobic.

Figure 4:
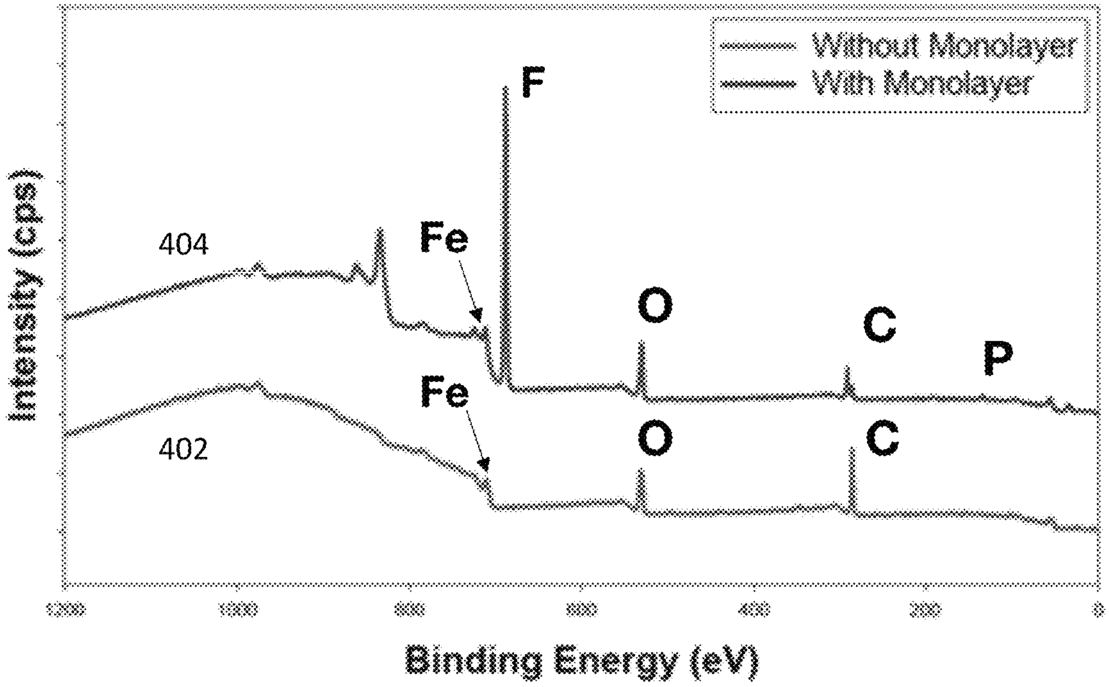
FIG. 4 illustrates XPS spectrum graphing of SAM coated and uncoated substrates, in accordance with some embodiments of the disclosure.

FIG. 4 illustrates XPS spectrum graphing of SAM coated and uncoated substrates 400, in accordance with some embodiments of the disclosure. Line 404 is with the SAM (monolayer), and line 402 is without the monolayer. X-ray photo-electron spectroscopy (XPS) further confirmed presence of the monolayer coating. Since the coating largely consists of long fluorinated chains, we can see the elemental fluorine peak in the XPS results. The XPS instrument used in this research (Kratos Analytical) determines the properties of the first 10 nm of the material surface. Since the XPS spectrum of the monolayer-covered steel detects iron present on the underlying substrate, we can infer that we have a coating thinner than 10 nm.

Figure 5:
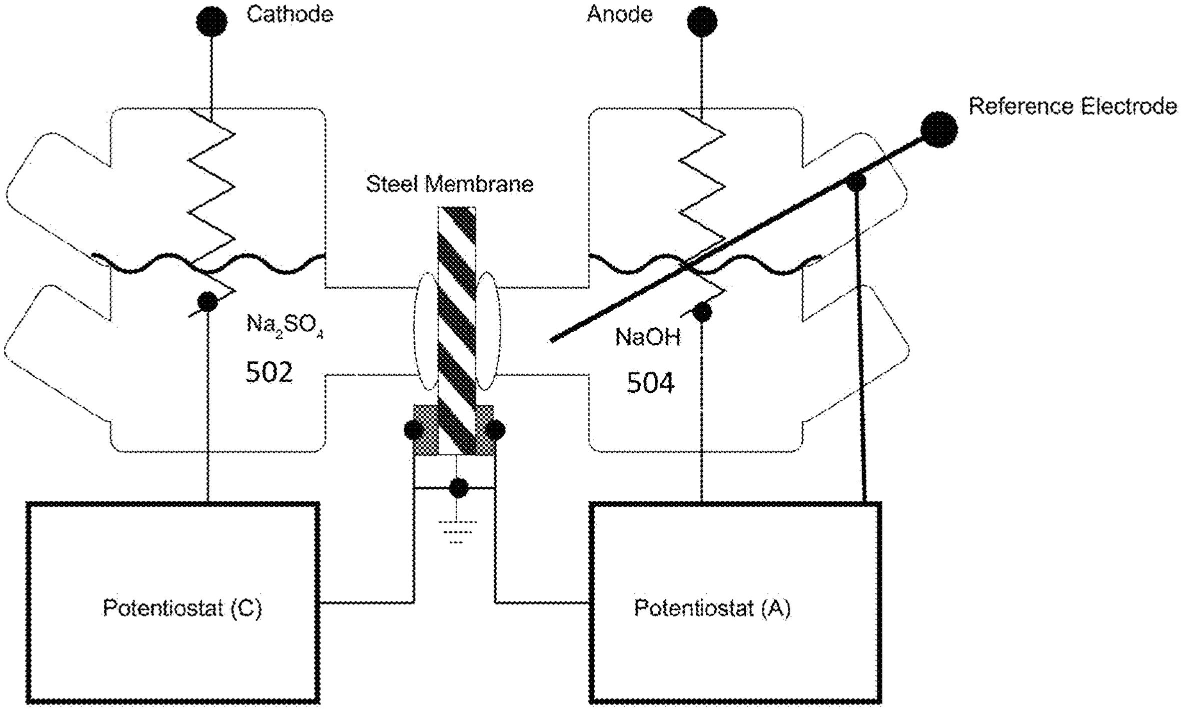
FIG. 5 shows an exemplary testing assembly, in accordance with some embodiments of the disclosure.

FIG. 5 shows an exemplary testing assembly 500, in accordance with some embodiments of the disclosure. To simulate pipeline hydrogen conditions inside the lab, we used a Devanathan-Stachurski H-cell.[10] The entry cell 502 was filled with 0.1M Na2SO4 along with 3 g/L of NH4SCN, a hydrogen recombination poison. The exit cell 504 was filled with 0.1 M NaOH solution. A power supply was used to provide a constant current of −0.4 mA to the entry side of the steel coupon causing hydrolysis and electrochemically generating hydrogen. This simulated the effect of hydrogen gas being present near the surface of the steel pipelines.

As the hydrogen passed through the steel sample, it was oxidized in the exit cell to protons, releasing electrons in the process. This electrical current associated with hydrogen oxidation was detected by a potentiostat in the exit cell. A constant potential of 300 mV with respect to an alkaline Hg/HgO electrode (CH instruments) was applied in the exit cell. From this current, we used well-established time-lag based diffusion models[4,11] to determine the hydrogen diffusion coefficient (measure of hydrogen permeability of a material) as well as the hydrogen flux.

Figure 6:
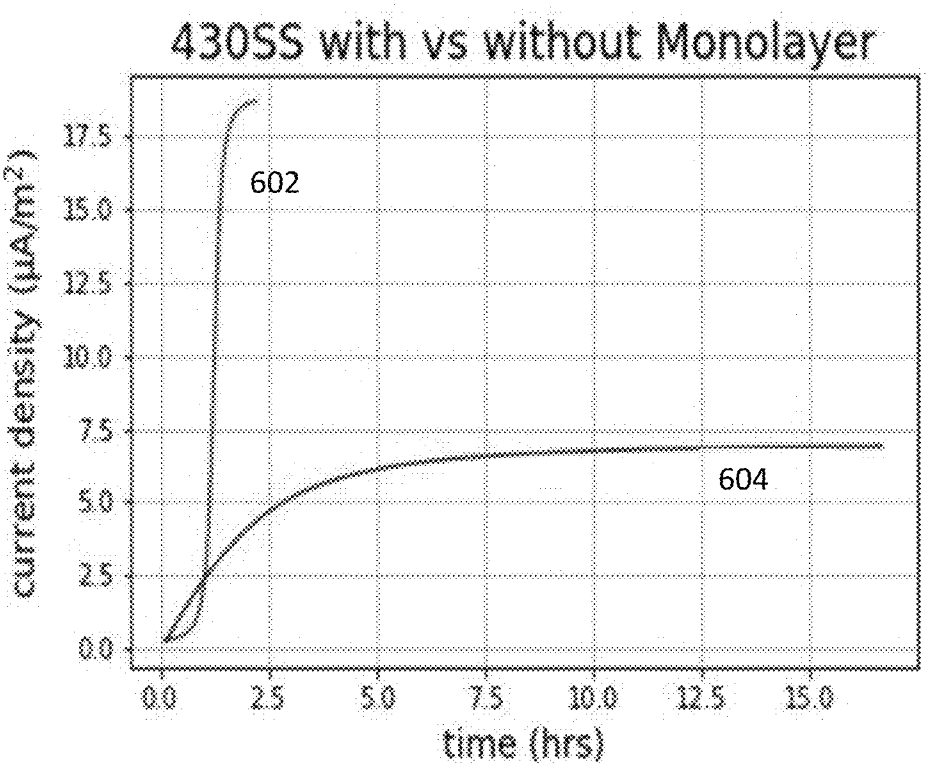
FIG. 6 shows a graph illustrating current density of SAM coated and uncoated substrates, in accordance with some embodiments of the disclosure.
Figure 7:
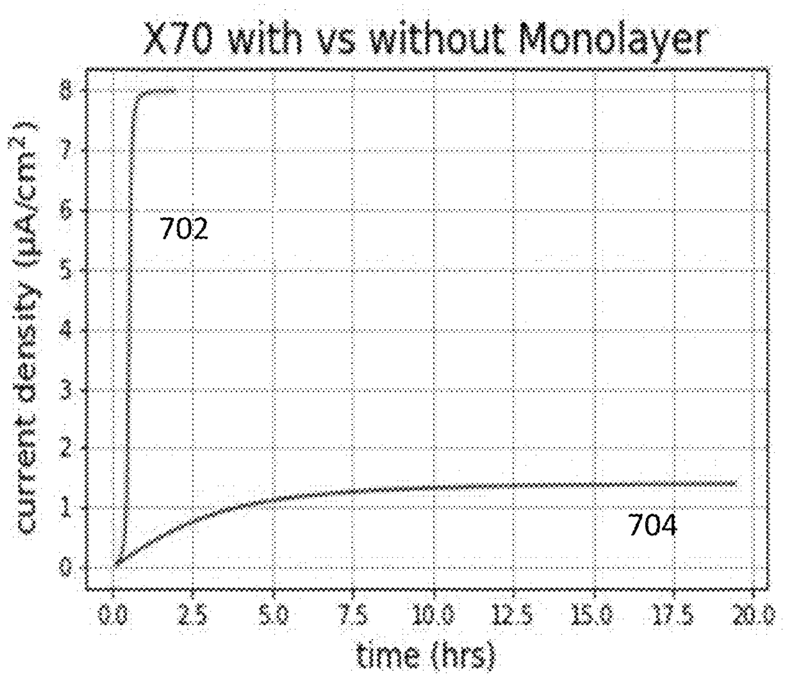
FIG. 7 shows a graph illustrating another example of current density of SAM coated and uncoated substrates, in accordance with some embodiments of the disclosure.

Key metrics for determining hydrogen permeation are the hydrogen diffusion coefficient and flux. Flux quantifies the moles of hydrogen passing through a $m^2$ of area of steel per second and hydrogen diffusion coefficient is a direct measure of the ability of the material to conduct hydrogen. These parameters are minimized using the FAPA monolayer, thus reducing the risk of hydrogen embrittlement in pipelines. FIG. 6 shows a graph 600 illustrating current density of SAM coated (604) and uncoated (602) substrates, in accordance with some embodiments of the disclosure. FIG. 7 shows a graph 700 illustrating another example of current density of SAM coated (704) and uncoated (702) substrates, in accordance with some embodiments of the disclosure. The following tables display the hydrogen diffusion coefficient and flux of each steel sample tested and those coated with monolayers:

| Value | 430SS | 430SS with Monolayer |
|---|---|---|
| Hydrogen Diffusion ($m^2/s$) | $3.98 \times 10^{-12}$ | $1.77 \times 10^{-12}$ |
| Hydrogen Flux ($mol/s/m^2$) | $18.72 \times 10^{-8}$ | $7.24 \times 10^{-8}$ |

| Value | X70 | X70 with Monolayer |
|---|---|---|
| Hydrogen Diffusion ($m^2/s$) | $4.68 \times 10^{-12}$ | $0.51 \times 10^{-12}$ |
| Hydrogen Flux ($mol/s/m^2$) | $8.02 \times 10^{-8}$ | $1.45 \times 10^{-8}$ |

Figure 8:
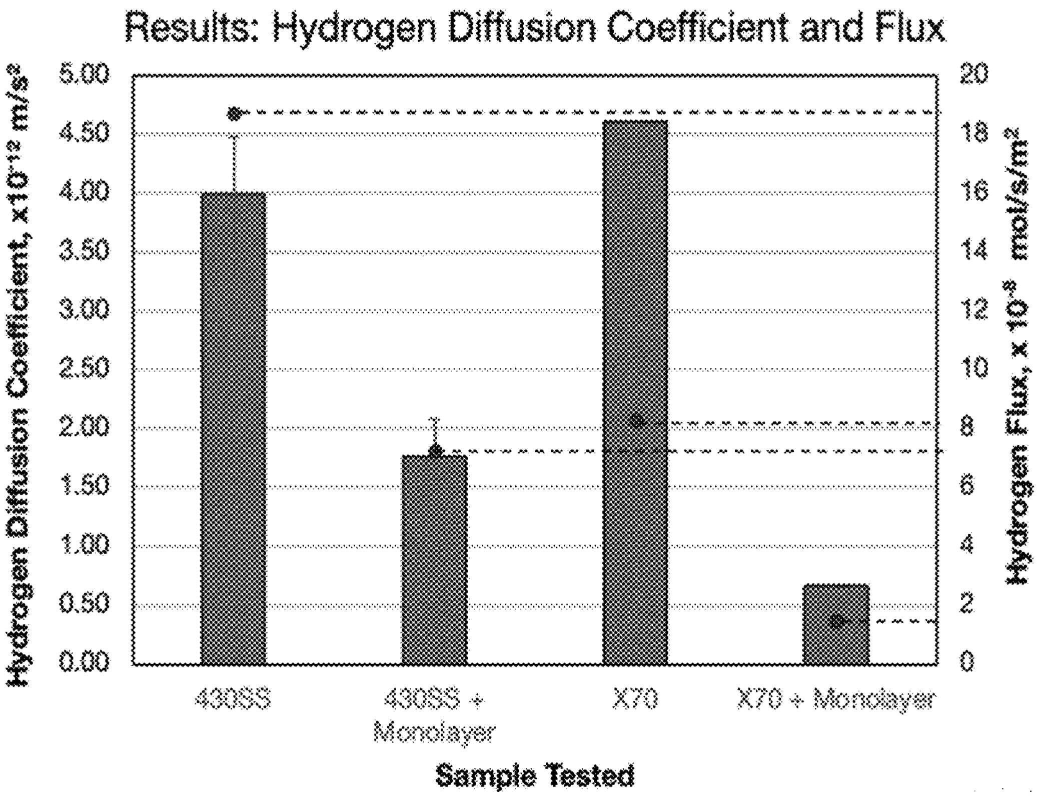
FIG. 8 shows a graph illustrating the resulting hydrogen diffusion coefficients and flux, in accordance with some embodiments of the disclosure.

As seen in the table above, there is a two-fold reduction in the hydrogen diffusion coefficient in 430 stainless steels. In the case of X70 steel we see a ten-fold reduction in the hydrogen diffusion coefficient. FIG. 8 shows a graph 800 illustrating the resulting hydrogen diffusion coefficients and flux, in accordance with some embodiments of the disclosure.

Many pipelines are typically made using X70 and X80 steels.[12] The illustrated reduction in the diffusion of hydrogen through these steels is a promising step towards bringing the pipelines up to standard for safely transporting hydrogen gas. Hydrogen embrittlement is caused by the flux of hydrogen atoms through steel, and thus a reduction in the hydrogen flux through steel coated with the FAPA monolayer reduces the risk caused by hydrogen embrittlement. These results demonstrate that the FAPA monolayer coating reduces hydrogen permeation even at a bare-minimum thickness of a few molecules. Realistically, the applied coating can be much thicker than a few molecules thereby providing more protection by increasing resistance to hydrogen diffusion.

Many pipelines are typically made using X70 and X80 steels.[12] The illustrated reduction in the diffusion of hydrogen through these steels is a promising step towards mitigating hydrogen embrittlement.

Figure 11:
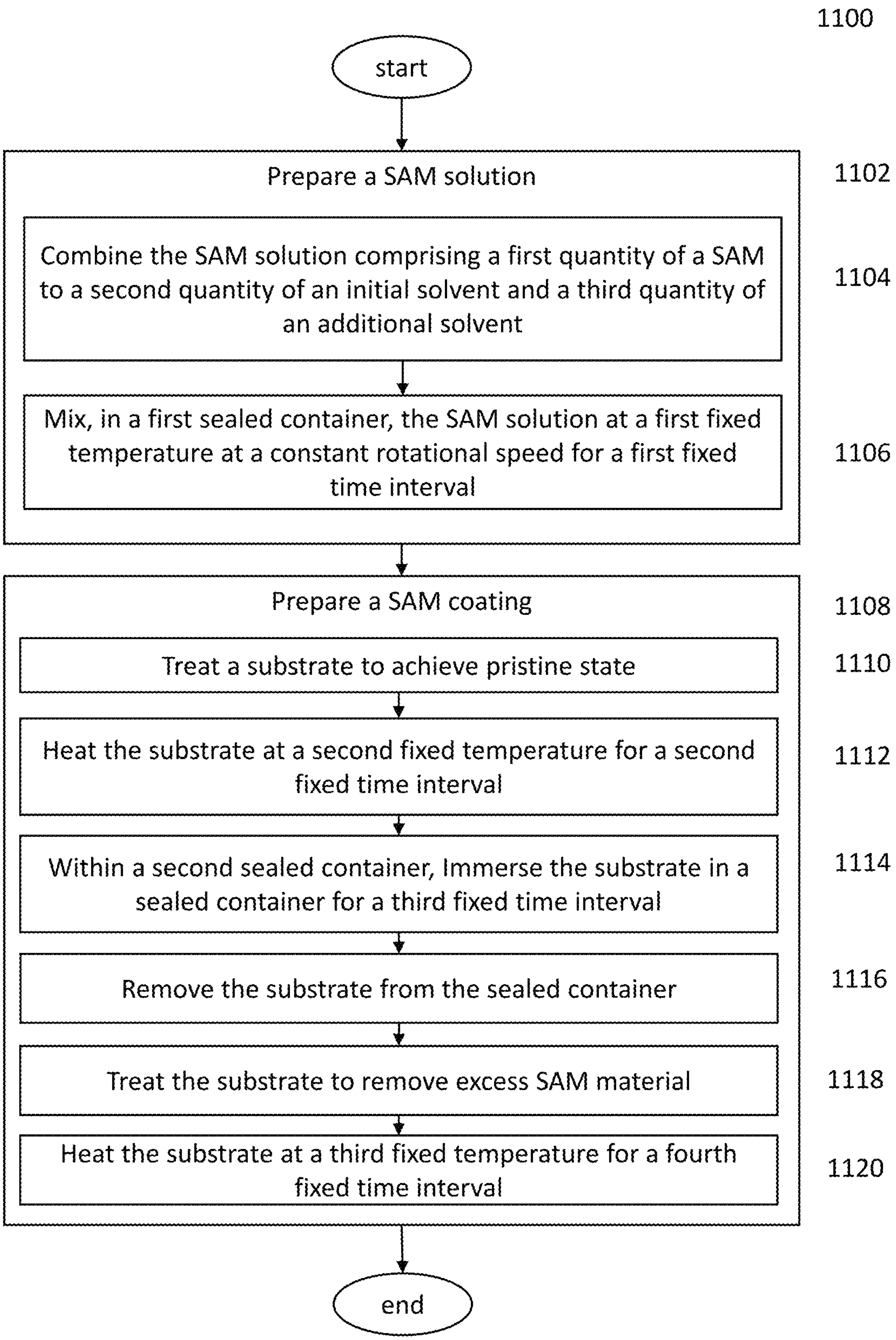
FIG. 11 is an illustrative flowchart of a method for preparing a stable hydrophobic self-assembled monolayer (SAM), in accordance with some embodiments of the disclosure.

FIG. 11 is an illustrative flowchart 1100 of a method for preparing a stable hydrophobic self-assembled monolayer (SAM) coating, in accordance with some embodiments of the disclosure.

At 1102, a SAM solution is prepared that includes the following sub-steps. At step 1104, a first quantity of a SAM compound is combined to a second quantity of an initial solvent and a third quantity of an additional solvent to form the SAM solution. At step 1106, in a first sealed container, the SAM solution is mixed at a first fixed temperature at a constant rotational speed for a first fixed time interval.

At 1108, the SAM coating is prepared that includes the following sub-steps. At step 1110, the substrate is treated to achieve pristine state. At step 1112, the substrate is heated at a second fixed temperature for a second fixed time interval. At step 1114, within a second sealed container, the substrate is immersed in a sealed container for a third fixed time interval. At step 1116, the substrate is removed from the sealed container. At step 1118, the substrate is treated to remove excess SAM material. At step 1120, the substrate is heated at a third fixed temperature for a fourth fixed time interval.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

Interpretation of Terms

Unless the context clearly requires otherwise, throughout the description and any accompanying claims (where present), the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

REFERENCES

1. Yue, M. et al. Hydrogen energy systems: A critical review of technologies, applications, trends and challenges. *Renewable and Sustainable Energy Reviews* 146, 111180 (2021).
2. The Hydrogen Strategy for Canada. Clean50 https://clean50.com/projects/lofty-ambitions-for-hydrogen-development-and-implementation-of-the-hydrogen-strategy-for-canada % e2%80% af/(2021).
3. CER-Canada's Pipeline System 2021-Crude Oil Pipeline Transportation System. https://www.cer-rec.gc.ca/en/data-analysis/facilities-we-regulate/canadas-pipeline-system/2021/crude-oil-pipeline-transportation-system.html.
4. Nagumo, M. *Fundamentals of Hydrogen Embrittlement*. (Springer Singapore, 2016). doi:10.1007/978-981-10-0161-1.
5. Nam, T.-H., Lee, J.-H., Choi, S.-R., Yoo, J.-B. & Kim, J.-G. Graphene coating as a protective barrier against hydrogen embrittlement. *International Journal of Hydrogen Energy* 39, 11810-11817 (2014).
6. Nemanič, V. Hydrogen permeation barriers: Basic requirements, materials selection, deposition methods, and quality evaluation. *Nuclear Materials and Energy* 19, 451-457 (2019).
7. Voloshchuk, I. & Zakroczymski, T. Hydrogen entry and absorption in ZrO2 coated iron studied by electrochemical permeation and desorption techniques. *International Journal of Hydrogen Energy* 37, 1826-1835 (2012).
8. Zajec, B. Hydrogen permeation barrier—Recognition of defective barrier film from transient permeation rate. *International Journal of Hydrogen Energy* 36, 7353-7361 (2011).
9. Gharbi, K. et al. Alkyl phosphonic acid-based ligands as tools for converting hydrophobic iron nanoparticles into water soluble iron-iron oxide core-shell nanoparticles. *New Journal of Chemistry* 41, 11898-11905 (2017).
10. Devanathan M. A. V., Stachurski Z., & Tompkins Frederick Clifford. The adsorption and diffusion of electrolytic hydrogen in palladium. *Proceedings of the Royal Society of London. Series A. Mathematical and Physical Sciences* 270, 90-102 (1962).
11. Crank, J. *The mathematics of diffusion*. (Clarendon Press, 1975).
12. Mohammadijoo, M., Collins, L., Henein, H. & Ivey, D. G. Canadian HSLA steel pipelines—History and technology developments. ERA https://era.library.ualberta.ca/items/a379aa08-e6dd-4dbf-9ba1-1fedfa601762 (2018) doi:10.7939/r3-wvqv-qg18.

We claim:

1. A method for preparing a stable hydrophobic self-assembled monolayer (SAM) coating, preparing a SAM solution, wherein the preparation of the SAM solution comprises:

combining a first quantity of a SAM compound to a second quantity of an initial solvent and a third quantity of an additional solvent to form the SAM solution; and mixing, in a first sealed container, the SAM solution at a first fixed temperature at a constant rotational speed for a first fixed time interval;

preparing the SAM coating, wherein the preparation of the SAM coating comprises:

treating a substrate to achieve a surface organic contamination below a threshold of 15% by atomic percentage;

heating the substrate at a second fixed temperature for a second fixed time interval;

within a second sealed container, immersing the substrate in the SAM solution for a third fixed time interval; and following the completion of the third fixed time interval:

removing the substrate from the second sealed container;

treating the substrate with the initial solvent and the additional solvent to remove excess SAM material; and heating the substrate at a third fixed temperature for a fourth fixed time interval.

2. The method of claim 1, wherein the SAM compound is C10 fluoroalkylphosphonic acid.

3. The method of claim 1, wherein the substrate is steel.

4. The method of claim 3, wherein the substrate is selected from at least one of: API 5L X70 steel and stainless steel 430.

5. The method of claim 1, wherein mixing the SAM solution comprises at least one of: implementation of a magnetic stir bar, and sonication via tip sonicator.

6. The method of claim 1, wherein heating the substrate at a second fixed temperature or heating the substrate at a third fixed temperature comprises at least one of:

heating the substrate on a hot plate, and heating the substrate in an oven.

7. The method of claim 1, wherein the treating the substrate to achieve a surface organic contamination below a threshold of 15% by atomic percentage comprises at least one of the following: treating the substrate with one or more solvents, heating the substrate to 500° C. for a specific time interval, and implementation of plasma cleaning to the substrate.

8. The method of claim 1, wherein the initial solvent and the additional solvent are methanol and isopropanol, respectively.

9. The method of claim 1, wherein the SAM compound, initial solvent, and additional solvent are provided in a weight ratio of 1/124.5/124.5, respectively.

10. The method of claim 1, wherein mixing the SAM solution at a first fixed temperature at a constant rotational speed for a first fixed time interval comprises 30° C., 100 rpm, and 48 hours, respectively.

11. The method of claim 1, wherein the third fixed time interval is 48 hours.

12. The method of claim 1, wherein heating the substrate at a third fixed temperature for a fourth fixed time interval comprises 100° C. for 30 minutes, respectively.

13. A method for preparing a stable hydrophobic self-assembled monolayer (SAM) coating, comprising:

preparing a SAM solution, wherein the preparation of the SAM solution comprises:

combining C10 fluoroalkylphosphonic acid to methanol and isopropanol to form the SAM solution; and mixing, in a first sealed container, the SAM solution at 30° C. at 100 rpm for a 48 hour interval;

preparing the SAM coating, wherein the preparation of the SAM coating comprises:

treating a steel to achieve a surface organic contamination below a threshold of 15% by atomic percentage;

heating the steel at 100° C. for 30 minutes;

within a second sealed container, immersing the steel in a sealed container for 48 hours; and following the completion of the 48 hours:

removing the steel from the second sealed container;

treating the steel to remove excess SAM material; and heating the steel at 100° C. for 30 minutes.

14. The method of claim 13 wherein the C10 fluoroalkylphosphonic acid, methanol, and isopropanol are provided in a weight ratio of 1/124.5/124.5, respectively.

15. The method of claim 13 wherein the steel is selected from at least one of API 5L X70 steel and stainless steel 430.

* * * * *